United States Patent [19]

Heanue

[11] 3,817,404
[45] June 18, 1974

[54] BAR REPLENISHING SYSTEM

[75] Inventor: Paul T. Heanue, Fayetteville, N.Y.

[73] Assignee: Lipe Rollway Corporation, Syracuse, N.Y.

[22] Filed: Oct. 13, 1972

[21] Appl. No.: 297,443

[52] U.S. Cl................................. 214/1.5, 82/2.7
[51] Int. Cl................................. B65h 5/00
[58] Field of Search .............. 214/1.1, 1.5, 1.2, 1.3, 214/1.4, 1 P, 1 R; 82/2.5, 2.7, 3; 226/176; 10/162 R, 162 S; 221/226, 104, 280, 105, 312 R, 106, 111

[56] References Cited
UNITED STATES PATENTS

| | | | |
|---|---|---|---|
| 744,357 | 11/1903 | King | 221/226 X |
| 1,251,191 | 12/1917 | Domeniconi | 221/280 X |
| 2,644,999 | 7/1953 | Hill | 214/1.4 X |
| 3,147,653 | 9/1964 | Jones, Jr. | 214/1.4 X |

*Primary Examiner*—Frank E. Werner
*Attorney, Agent, or Firm*—Cumpston, Shaw & Stephens

[57] ABSTRACT

The invention feeds replenishment bars into the stock tube of a screw machine to follow a preceding bar into a bar feeder mechanism. It includes resilient means for engaging the trailing end of the replenishing bar and urging it into the rear end of the stock tube; also, a bushing just ahead of the bar feeder has a through opening sized to admit only one of the bars to the feeder, and the bar entry end of the bushing has a concave surface funnelling down to the through opening to hold the replenishing bar until the trailing end of the preceding bar passes into the through opening.

7 Claims, 3 Drawing Figures

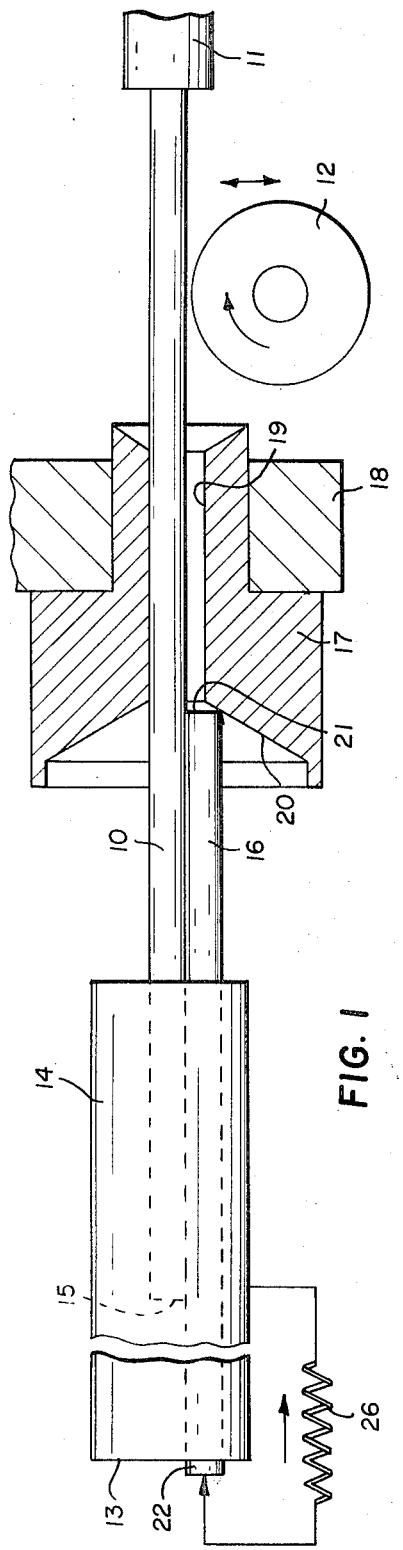
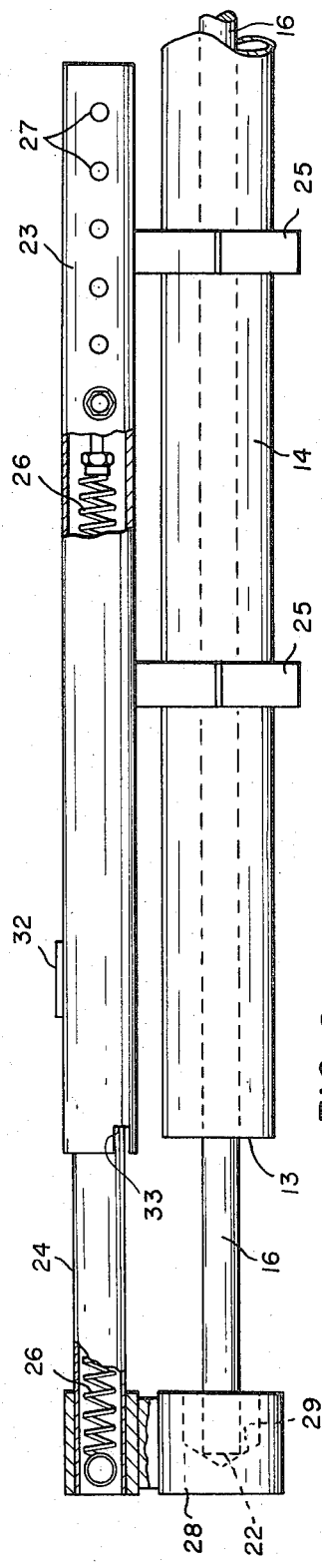
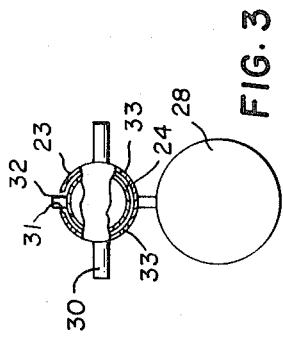

BAR REPLENISHING SYSTEM

THE INVENTIVE IMPROVEMENT

Supplying replenishment bars to screw machines has long been a problem, but the invention recognizes a simple and expedient way of automatically introducing a replenishment bar to the machine's bar feeder at the proper time to follow a preceding bar. In doing this, the invention aims at simplicity, economy, reliability and compatibility with existing screw machines and bar feeding equipment.

SUMMARY OF THE INVENTION

The inventive bar replenishing system applies to a screw machine having a stock tube and a bar feeder. It includes means at the rear end of the stock tube for engaging the trailing end of a replenishing bar, and resilient means for urging the replenishing bar into the rear end of the stock tube. A bushing just ahead of the bar feeder has a through opening sized to admit only one bar to the feeder, and the bar entry end of the bushing has a concave surface funnelling down to the through opening. A replenishment bar can be urged to follow the trailing end of a preceding bar, or can be overlapped with the preceding bar in the stock tube to have the leading end of the replenishment bar rest against the concave surface of the bushing until the trailing end of the preceding bar passes into the through opening of the bushing.

DRAWINGS:

FIG. 1 is a partially schematic, partially cut-away elevational view of a preferred embodiment of the inventive bar replenishing system;

FIG. 2 is a partially schematic, partially cut-away fragmentary view of the system of FIG. 1 as applied to the rear end of the stock tube; and FIG. 3 is an elevational view of the rear end of the system of FIG. 1.

DETAILED DESCRIPTION:

A working or preceding bar 10 is fed into spindle liner 11 of a screw machine (not shown) by the drive roller 12 of a bar feeder as schematically illustrated in FIG. 1. Drive roller 12 rotates in the direction of the arrow and is moved into engagement with bar 10 in time with the screw machine for feeding bar 10 forward as is generally known. Many other feeder mechanisms can be used other than drive roller 12, and the screw machine being fed can receive one bar 10 in each of several spindles, or can be a single spindle machine. In other words, the system illustrated in the drawings can be applied to any number of bars being fed by any sort of feeder means to any type of screw machine.

Bar 10 is loaded into the rear end 13 of stock tube 14, and the trailing end 15 of bar 10 proceeds forward in stock tube 14 as bar 10 is advanced by drive roller 12. For many screw machines, stock tube 14 is large enough to accommodate more than one bar at a time, especially when bars of less than the maximum size are being used in the machine. This allows a replenishing bar 16 to be loaded into stock tube 14 alongside bar 10 some time before bar 10 is consumed.

A bushing 17 held in a support plate 18 guides bar 10 toward drive roller 12, and bushing 17 has a through opening 19 large enough to receive only one bar so that bar 16 cannot enter opening 18 until the trailing end 15 of bar 10 passes into opening 19. The bar entry end of bushing 17 has a concave surface 20 that is preferably conical with an included angle of preferably 120° for receiving the leading end of bar 16 and restraining bar 16 from further forward motion until the trailing end 15 of bar 10 passes into opening 19. Conical surface 20 with its included angle of about 120° has been found to have the right pitch to keep leading end 21 of bar 16 as close as possible to through opening 19 and ready to enter opening 19 behind trailing end 15, without any binding between bar 16 and rotating bar 10. The bar entry end of bushing 17 also preferably has an outside diameter more than three times the outside diameter of bars 10 and 16 so that the leading end 21 of bar 16 engages conical surface 20 within the periphery of bushing 17.

Resilient force is applied to the trailing end 22 of bar 16 to urge it forward against bushing 17 so that bar 16 is urged into opening 19 behind trailing end 15 of bar 10 and into engagement with drive roll 12 to follow bar 10 into spindle liner 11 for replenishing the screw machine. One preferred arrangement for applying resilient force to trailing end 22 is best shown in FIGS. 2 and 3.

A housing tube 23 is secured to stock tube 14 by collar clamps 25, and an extension piece 24 is telescoped inside housing 23 to move axially of stock tube 14. Extension piece 24 is preferably tubular and contains a tension spring 26 adjustably secured to one of the holes 27 in housing 23. Then extension tube 24 can be pulled axially out of housing 23 and away from the rear end 13 of stock tube 14, and spring 26 biases extension tube 24 back into housing 23.

Extension tube 24 carries a cup 28 having a hollow 29 for engaging the rear end 22 of replenishing bar 16. A handle 30 on extension tube 24 can be gripped for pulling extension 24 rearwardly and fitting cup 28 over the rear end 22 of replenishing bar 16. Then spring 26 urges bar 16 forward against bushing 17 as shown in FIG. 1.

Housing 23 preferably has a keyway 31, and extension tube 24 carries a key 32 that fits in keyway 31 to hold cup 28 in alignment with stock tube 14, particularly near the end of travel of extension tube 24 inward back into housing 23. This allows an extension rod to be fitted to cup 28 to extend forward into stock tube 14 for urging replenishing bar 16 for some distance into the rear end of stock tube 14. The need for this depends on the length of bar 16 relative to stock tube 14. Key 32 also serves as a detent member for engaging detent slots 33 at the rear end of housing 23 so that cup 28 can be held in an off-axis position on either side of stock tube 14. This allows the operator to pivot cup 28 aside while loading a replenishing bar 16 into stock tube 14. Key 32 also keeps cup 28 from flapping about as the machine indexes after stock is no longer engaging cup 28.

If bars 10 and 16 are so large relative to stock tube 14 that they cannot fit side-by-side in stock tube 14, then a replenishing bar 16 can be loaded in behind the trailing end 15 of bar 10, after bar 10 is nearly consumed. In such a circumstance, the operator waits until bar 10 is nearly consumed and then loads bar 16 into stock tube 14 so that leading end 21 of bar 16 engages trailing end 15 of bar 10. Cup 28 is placed over the trailing end 22 of bar 16, and spring 26 urges bar 16 forward in axial, trailing alignment with bar 10.

For a multi-spindle screw machine having several stock tubes 14, the bar pushing equipment shown in the drawings and described above is preferably applied to each stock tube. Then support plate 18 is arranged to index with the stock reel of the machine, and a bushing 17 is aligned with each stock tube 14 so that the inventive system can be applied to each bar being fed to the machine. Those skilled in the art will understand ways of attaching the inventive equipment to existing screw machines, and the preferred embodiments of the invention are made simply as illustrated for easy application to existing screw machines. Many different springs or resilient means can be used to apply bias to the trailing end of a replenishing bar, and convenient ways are available for mounting bushings ahead of stock tubes to position and control the replenishing bar.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand how to adapt the inventive system to particular screw machines and bar feeding circumstances.

I claim:

1. A system for replenishing bars for for a screw machine having a stock tube and a bar feeder between said stock tube and said screw machine, said replenishing system comprising:
   a. means at a rear end of said stock tube remote from said screw machine for engaging a trailing end of a replenishing bar;
   b. resilient means for biasing said engaging means to urge said replenishing bar into said rear end of said stock tube and toward said bar feeder;
   c. a bushing between said bar feeder; and said stock tube;
   d. said bushing having a through opening sized to admit only one of said bars to said bar feeder;
   e. the bar entry end of said bushing having a concave surface funnelling down to said through opening; and
   f. said stock tube is large enough to hold said replenishing bar alongside a preceding bar, and the leading end of said replenishing bar rests against said concave surface of said bushing until the trailing end of said preceding bar enters said through opening in said bushing.

2. The bar replenishing system of claim 1 wherein the outside diameter of said bushing is more than three times the outside diameter of said bars.

3. The bar replenishing system of claim 1 wherein said concave surface is conical with an included angle of approximately 120°.

4. The bar replenishing system of claim 1 including means for pivoting said engaging means off the axis of said stock tube.

5. The bar replenishing system of claim 1 wherein said engaging means includes a housing tube secured to said stock tube and an extension tube resiliently movable in and out of said housing tube.

6. The bar replenishing system of claim 5 including a tension spring inside said extension tube and connected to said housing tube.

7. The bar replenishing system of claim 5 wherein said extension tube carries a socketed member for engaging said trailing end of said replenishing bar, said housing tube has a keyway, and said extension tube has a key for sliding in said keyway to align said socketed member with said stock tube.

* * * * *